July 3, 1962  L. L. BERKMAN  3,042,373
PIPE PULLING MACHINE

Filed June 29, 1960  2 Sheets-Sheet 1

Lou L. Berkman
INVENTOR.

BY Clarence A. O'Brien
and Harvey B. Jacobson
Attorneys

July 3, 1962 L. L. BERKMAN 3,042,373
PIPE PULLING MACHINE
Filed June 29, 1960 2 Sheets-Sheet 2

Lou L. Berkman INVENTOR.

BY Clarence A. O'Brien
and Harvey B. Jacobson
Attorneys

United States Patent Office 3,042,373
Patented July 3, 1962

3,042,373
PIPE PULLING MACHINE
Lou L. Berkman, 142 South St., Middletown, N.Y.
Filed June 29, 1960, Ser. No. 39,611
6 Claims. (Cl. 254—29)

This invention relates to a novel machine for pulling pipe from well casings.

The primary object of this invention is to provide a machine especially useful for pulling or installing pipes of different dimensions in a more efficient manner than has heretofore been possible.

Another object of this invention is to provide a pipe pulling machine capable of performing its function with a tremendous savings in labor.

A further object of this invention is to provide a pipe pulling machine that may be readily set up for operation and eliminates the serious accident potential for personnel working in the operation of pulling and installing pipes.

An additional object of this invention is to provide a pipe pulling machine which by virtue of its novel construction and arrangement of parts is rendered more compact, light in weight and thereby easier to handle and yet powerful enough for accomplishing the purposes for which it is designed.

The pipe pulling machine made in accordance with this invention comprises a horizontally disposed frame having a portion within which a plurality of pipe gripping rollers are journalled which are spaced from each other unequal amounts so as to accommodate different sized pipes therebetween, the remotely located rollers being drivingly interconnected with each other by means of a sprocket chain drive while the closer spaced rollers are drivingly interconnected with each other by means of positive gearing while an input gear is drivingly connected to one set of said remotely located rollers. The other portion of the frame mounts an electric motor which is geared to the input gear by means of a high reduction gearing such as a worm and worm wheel. The frame is mounted on adjustable legs so that the machine may be properly set above a well casing from which the pipe may be pulled or installed by means of the machine. The invention therefore features rollers for gripping the pipe therebetween, said rollers being assembled on a roller shaft to which a roller hub is secured of relatively rigid material while a rubber or yieldable type roller rim is bonded to the hub. The roller rim has an intermediate grip portion which is indented and has a curvature for accommodating and gripping pipe, said indented portion therefore including a plurality of circumferentially spaced grooves so as to provide traction against the pipe being pulled or installed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
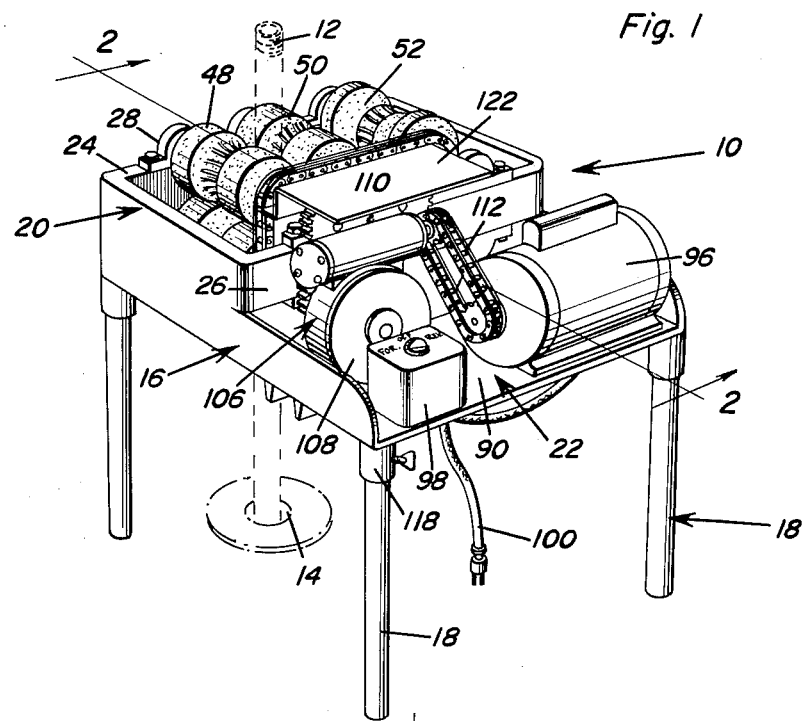
FIGURE 1 is a perspective view of the pipe pulling machine made in accordance with this invention.

In the accompanying drawings, the pipe pulling machine is generally indicated by reference numeral 10 and as illustrated in FIGURE 1 the machine is shown in set up position for pulling or installing a pipe 12 extending into a well casing 14. As will be seen in FIGURE 1, the machine 10 includes a frame assembly generally indicated by reference numeral 16 which is mounted upon a plurality of adjustable legs 18. The frame assembly 16 includes a roller mounting portion 20 and a power mounting portion 22.

Figure 2:
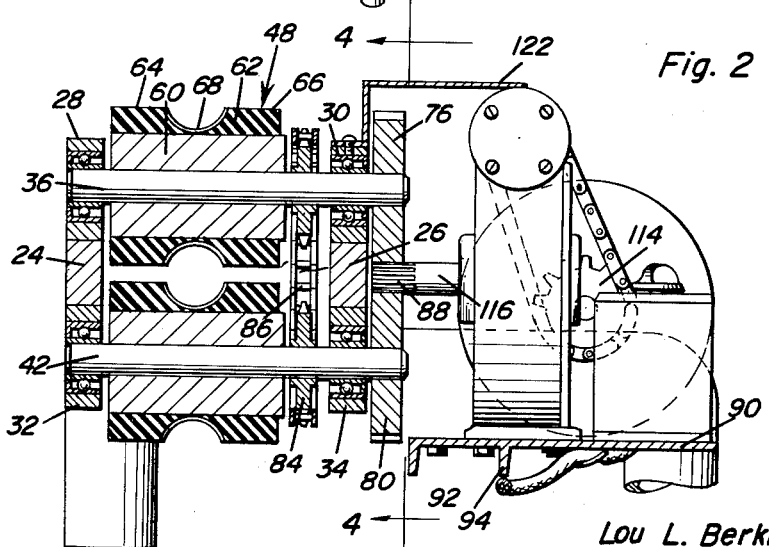
FIGURE 2 is a sectional view taken through a plane indicated by section line 2—2 in FIGURE 1.
Figure 3:
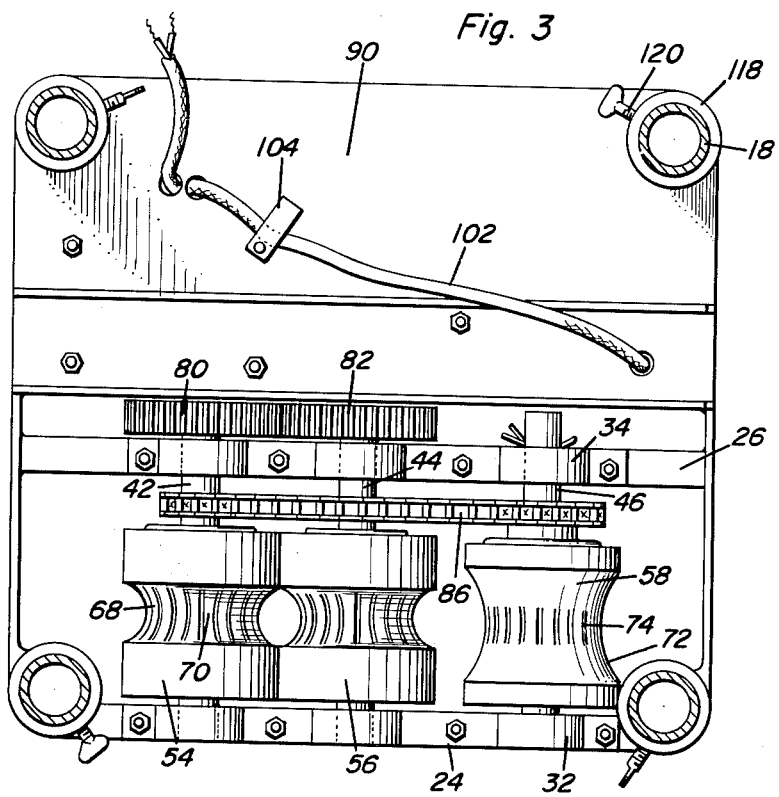
FIGURE 3 is a bottom view of the machine.

It will be observed that the roller mounting portion of the frame assembly includes a side wall 24 disposed parallel to a partition wall 26. Secured to the top edges of the side wall 24 and the partition wall 26 are a plurality of journal bearings 28 and 30 as more clearly seen in FIGURE 2. Also, a plurality of journal bearings 32 and 34 are secured to the bottom edges of the side wall 24 and partition wall 26 respectively as seen in FIGURES 2 and 3. Journalled in the journal bearings 28 and 30 are three roller shafts 36, 38 and 40 which are disposed parallel to each other, the spacing between roller shafts 38 and 40 being greater than the spacing between roller shafts 36 and 38 as will be more clearly seen in FIGURE 4. A second set of three roller shafts 42, 44 and 46 which are vertically aligned wtih the shafts 36, 38 and 40, respectively, are journalled between the journal bearings 32 and 34 connected to the bottom edges of the side wall 24 and partition wall 36 as will be more clearly seen in FIGURE 4. Each of the roller shafts has a roller secured thereto. Rollers 48, 50 and 52 are connected to the upper parallel roller shafts 36, 38 and 40 while rollers 54, 56 and 58 are connected to the bottom roller shafts 42, 44 and 46, respectively, as more clearly seen in FIGURE 3.

Referring to FIGURES 1 and 3, it will be observed that the rollers 48, 50, 54 and 56 are of identical construction while the rollers 52 and 58 are of a different construction from the other four rollers. Referring therefore to FIGURE 2, the construction of the first four rollers will be more clearly seen as including a rigid hub portion 60 which is secured to the roller shaft 36, for example, and includes an outer rim portion 62 which may be of any type of yieldable material such as rubber which is bonded or molded to the hub 60. It will also be observed that the rim portion 62 of the roller includes axially outer cylindrical portions 64 and 66 with an intermediate indented portion 68 of such curvature as to accommodate a pipe of a certain radius. As will be more clearly seen in FIGURE 3 therefore the indented portion 68 of the roller includes a plurality of circumferentially spaced grooves 70 so that the curved intermediate indented portion 68 may have the requisite traction for gripping the pipe. While the foregoing description of the rollers was made with respect to roller 48 it will of course be understood that the same applies to the rollers 50, 54 and 56. With regard to rollers 52 and 58, the construction is similar except for the curvature of the intermediate portion 72 and the axial extent of the groove 74 in said intermediate portion which is arranged for accommodating and gripping pipe of larger diameter as will be apparent in FIGURE 1.

Figure 4:
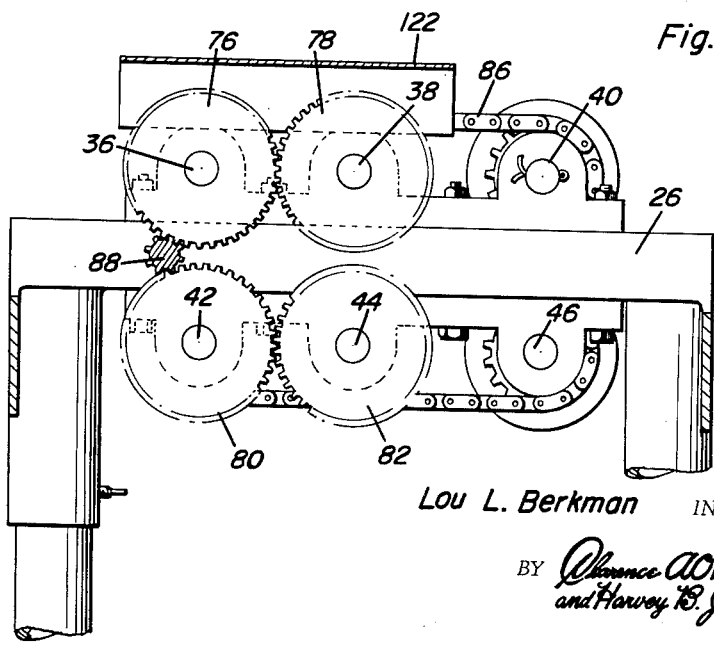
FIGURE 4 is a sectional view taken through a plane indicated by section line 4—4 in FIGURE 2.

Referring now to FIGURE 4, it will be observed that the roller shafts 36 and 38 are drivingly interconnected by gears 76 and 78 while the roller shafts 42 and 44 are drivingly interconnected by means of gears 80 and 82. As will be more clearly seen in FIGURES 2 and 3, the gears 76, 78, 80 and 82 are disposed on that side of the partition wall 26 opposite the side on which the rollers are mounted. It will also be observed in FIGURE 2 that to each of the roller shafts 36 and 42 a sprocket gear 84 is connected between the rollers 48 and 54 respectively mounted thereon and the partition wall 26. Similarly, sprocket gears are connected to the roller shafts 40 and 46, while a sprocket chain 86 drivingly interconnects all of the roller shafts by engagement with these sprocket wheels connected thereto.

Referring now to FIGURES 2 and 4, it will be observed that the gears 76 and 80 are driven from an input gear 88 which thereby drives each of the rollers. It will therefore be apparent that the greater amount of torque is imparted to the more closely spaced rollers by virtue of the positive gear interconnections therebetween while the more widely spaced rollers 58 and 56 and 52 and 50 will have less torque applied thereto. It will therefore be appreciated that the torque of greater magnitude is applied to the smaller diameter pipes inasmuch as a smaller gripping surface is available.

It will be observed in FIGURES 2 and 3 in particular, that the power mounting portion of the frame assembly 22 includes a bottom wall 90 which is reinforced by a pair of ribs 92 and 94. An electric motor 96 is secured to the bottom wall 90 of the power mounting portion of the frame assembly 22. Also, a control box 98 is mounted on the bottom wall 90 and includes an extension cord 100 connected thereto through which electric power is supplied to the electric motor 96. Electrical conduit 102 therefore interconnects the control box 98 with the electric motor 96 and is disposed beneath the bottom wall 90 of the frame assembly as more clearly seen in FIGURE 3, said conduit 102 being held in place by means of a clip 104. Accordingly, the control box 98 may control the motor so as to operate it in either forward or in reverse.

Also mounted on the portion 22 of the frame assembly is a worm gear housing 106 which includes a worm wheel housing portion 108 and a worm housing portion 110. The worm gear rotatably mounted within the housing portion 110 is drivingly connected to the motor 96 by means of sprocket chain 112 trained over a sprocket wheel connected to the worm gear and a sprocket wheel 114 connected to the motor shaft. The worm wheel has connected thereto and disposed perpendicular to the worm gear an output shaft 116 on which the input gear 88 is cut as will more clearly be seen in FIGURE 2. The worm gearing as will be apparent to anyone skilled in the art thereby provides a high reduction drive between the electric motor 96 and the input gear 88 to drive the pipe pulling rollers.

It will be observed that each of the legs 18 are slidably connected to a tubular portion 118 fixed to the underside of the frame assembly 16. A setscrew 120 is therefore provided in order to vertically adjust and connect the legs 18 to the frame assembly. It will also be observed in FIGURES 1 and 2 in particular, that a shield member 122 is provided for the gears 76, 78, 80 and 82 and is fastened to the top of the journal bearings 30 on the top edge of the partition wall 26.

From the foregoing description, operation and functioning of the pipe pulling machine will be apparent. It will also be recognized that by virtue of the arrangement a highly compact and efficeintly operating machine is made possible.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:
1. A pipe pulling machine comprising frame means, a plurality of parallel roller grip means journaled in said frame means including a set of horizontally arranged roller means spaced from each other unequal amounts so as to accommodate and grip different sized pipes therebetween including remotely located roller means and adjacent roller means, flexible means drivingly interconnecting said remotely located roller means, gear means drivingly interconnecting said adjacent roller means and input gear means drivingly connected to said first mentioned gear means.

2. The machine as defined in claim 1, wherein said roller means includes a plurality of vertically spaced, aligned sets of horizontally spaced gripping roller assemblies.

3. The machine as defined in claim 2, including adjustable leg means for supporting said frame means.

4. The machine as defined in claim 3, wherein each roller assembly comprises a shaft journalled in said frame means, a rigid roller hub fixed to said shaft and a roller rim of yieldable material bonded to said hub, said rim having axially outer cylindrical portions and an intermediate indented grip portion of predetermined curvature and axially extending, circumferentially spaced grooves formed in said indented portion.

5. The machine as defined in claim 1, wherein each roller means comprises a shaft journalled in said frame means, a rigid roller hub fixed to said shaft and a roller rim of yieldable material bonded to said hub, said rim having axially outer cylindrical portions and an intermediate indented grip portion of predetermined curvature and axially extending, circumferentially spaced grooves formed in said indented portion.

6. A pipe pulling machine comprising, a horizontally disposed frame having a roller mounting portion and a power mounting portion, said roller mounting portion including a side member and a partition member parallel thereto and spaced therefrom, two pair of vertically aligned rollers journalled between said side and partition members and horizontally spaced from each other a predetermined amount so as to grip pipe of smaller dimension therebetween and a third pair of rollers horizontally spaced from an adjacent pair of rollers a distance greater than said predetermined amount so as to accommodate pipe of larger dimension, a gear connected to each roller of said two pair of rollers, said gears on horizontally spaced rollers meshing with each other, an input gear meshing with the gears connected to one pair of said two pair of rollers, said gears being journalled on and disposed adjacent to said partition member on one side thereof opposite the rollers, chain and sprocket means drivingly interconnecting one pair of said vertically aligned rollers to said third pair of rollers and disposed on the other roller side of the partition member adjacent thereto, electric motor means mounted on said mounting portion of said frame and disposed parallel to said partition member and reduction gearing drivingly connecting said motor to said input gear.

References Cited in the file of this patent
UNITED STATES PATENTS

| | | |
|---|---|---|
| 2,433,477 | O'Quinn et al. | Dec. 30, 1947 |
| 2,843,358 | Anderson | July 15, 1958 |